Patented Aug. 12, 1941

2,252,590

UNITED STATES PATENT OFFICE 2,252,590

FLUORESCENT SCREEN

Henry Wolfson, London, England, assignor to Western Electric Company, Incorporated, New York, N. Y., a corporation of New York No Drawing. Application September 12, 1939, Serial No. 294,483. In Great Britain September 13, 1938

18 Claims. (Cl. 250—80)

This invention relates to fluorescent screens and primarily to fluorescent screens for cathode ray tubes.

Cathode ray screens manufactured according to known methods, in which the fluorescent powder consists wholly or partially of metal sulphides, such as zinc and/or cadmium sulphide, and which are bonded to the glass by a binder such as a silicate, phosphate, borate, or hydroxide of sodium or potassium, have, under certain conditions, given rise to various undesirable effects.

One such undesirable effect associated with sulphide type screens is a burning or blackening of the fluorescent powder under the bombardment of the screen by cathode rays. This is very noticeable in the case of gas-filled tubes employing sulphide screens.

I have found that this blackening is due to the formation of free zinc (or metal) from the zinc (or metal) sulphide. It is proposed in accordance with the present invention to incorporate in the screen a substance which will act as an inhibitor, and prevent this dissociation of the fluorescent metal sulphide; as inhibitor I use a substance relatively rich in combined sulphur, but free from heavy metals or heavy metal compounds. This substance may be mixed with the fluorescent powder or with the screen binder, or it may be chosen so as to act as the sole binding agent, while retaining its properties as an inhibitor.

I have found that such a substance as sodium thiosulphate or potassium thiosulphate prevents burning or blackening of the fluorescent sulphide powder.

In one method of carrying out the invention, I apply to the uncoated clean glass surface by spraying, brushing or other suitable method, an aqueous solution of sodium thiosulphate and, while this is still wet, the fluorescent powder is applied by blowing or other method on to the binder. The screen is then baked in air, vacuum or any desired gaseous atmosphere at from 200 to 450° C. (or more if desired) to remove water from the binder and to bond the fluorescent powder to the glass.

Another undesirable effect associated with the silicate binders arises during the screen baking process, in which the fluorescent metal sulphide powder becomes firmly bonded to the glass bulb by the combined agency of the binder and heat. If too high a baking temperature is employed, part of the zinc (metal) sulphide is converted superficially into zinc (metal) silicate, which has a different color of fluorescence from the original zinc (metal) sulphide and thus gives rise to stained or spotted screens. If the screen is baked at a low temperature to avoid this, trouble may be experienced due to bad adhesion to the glass.

No such combination occurs with binders of the type described above, and furthermore satisfactory bonding can be achieved at comparatively low baking temperature, say of the order of 250° C.

It is not, however, essential to use a low baking temperature as I have found the method quite satisfactory even when the thiosulphate is decomposed, in situ, by heat, the complex decomposition products (sulphate, sulphite, polysulphides, etc.) still acting in the manner described.

Although the use of sodium or potassium thiosulphate has been specifically described, any sulphur compound in which the sulphur-bearing radical can act as an inhibitor of dissociation of zinc (metal) sulphide under cathode ray bombardment, and/or as a screen binder can be used.

What is claimed is:

1. A fluorescent screen comprising a metal sulphide and another sulphur compound having a sulphur-bearing radical which acts as an inhibitor of dissociation of the metal sulphide.

2. A fluorescent screen comprising zinc sulphide and sodium thiosulphate.

3. The method of making a fluorescent screen for a cathode ray tube which consists in applying to a clean glass surface an aqueous solution of a substance from the group consisting of sodium thiosulphate and potassium thiosulphate, applying a fluorescent metal-sulphide powder on said solution while still wet, and baking said layer to remove water from the thiosulphate solution and to bond the fluorescent powder to the glass.

4. Method according to claim 3 wherein the screen is baked at a temperature of between 200° C. and 450° C.

5. A fluorescent screen comprising a support, and a thin layer on said support of a mixture comprising a metallic sulphide and a thiosulphate of a metal which is lighter than the metal of said sulphide which acts as an inhibitor of dissociation of the metal sulphide.

6. The method of producing a fluorescent screen which comprises mixing a sulphur compound and a binder from the group consisting of silicates, borates, phosphates, and hydroxides of sodium and potassium, applying a layer of said mixture with water to a support, applying a fluorescent powder in a uniform layer over said mixture, and baking the resulting layer.

7. The method of producing a fluorescent screen which comprises applying a layer of a material from the group consisting of sodium and potassium thiosulphate with water to a support, applying a fluorescent powder in a uniform layer over said first layer and baking the resulting layer at a temperature above 200° C.

8. The method of producing a fluorescent screen which comprises applying a layer of a mixture of a material from the group consisting of sodium thiosulphate and potassium thiosulphate with a silicate and water to a support, applying a fluorescent powder comprising at least one from the group consisting of zinc and cadmium sulphides over said mixture and baking the resulting layer at a temperature above 200° C.

9. A fluorescent screen comprising a support and a fluorescent layer tightly bound to said support by baking said support on which is a layer of material comprising metallic sulphide fluorescent powder and a thiosulphate.

10. A fluorescent screen comprising a support and a fluorescent layer tightly bound to said support by baking said support and a layer thereon of an intimate aqueous mixture comprising metallic sulphide fluorescent powder, sodium thiosulphate and a silicate.

11. A fluorescent screen comprising a support and a fluorescent layer tightly bound to said support by baking said support and a layer thereon of an intimate aqueous mixture comprising zinc sulphide, sodium thiosulphate and a silicate.

12. A fluorescent screen comprising a support and a fluorescent layer tightly bound to said support by baking said support and a layer thereon of an intimate aqueous mixture comprising zinc sulphide and sodium thiosulphate.

13. A fluorescent screen comprising a support and a fluorescent layer tightly bound to said support by baking said support and a layer thereon of an intimate aqueous mixture comprising cadmium sulphide, sodium thiosulphate and a silicate.

14. A fluorescent screen comprising a support and a fluorescent layer tightly bound to said support by baking said support and a layer thereon of an intimate aqueous mixture comprising cadmium sulphide and sodium thiosulphate.

15. A binder for a fluorescent screen comprising an alkali thiosulphate.

16. A binder for a fluorescent screen comprising one of the group consisting of sodium thiosulphate and potassium thiosulphate.

17. A fluorescent screen formed from materials comprising at least one of the group consisting of zinc sulphide and cadmium sulphide and one of the group consisting of sodium thiosulphate and potassium thiosulphate.

18. A fluorescent screen formed from materials comprising at least one of the group consisting of zinc sulphide and cadmium sulphide, one of the group consisting of sodium thiosulphate and potassium thiosulphate, and at least one binder from the group consisting of silicates, borates, phosphates and hydroxides of sodium or potassium.

HENRY WOLFSON.